United States Patent [19]

Fensom

[11] 4,384,883
[45] May 24, 1983

[54] REDUCTION OF FERROTITANIFEROUS MATERIALS

[75] Inventor: Donald J. Fensom, South Yarra, Australia

[73] Assignee: ICI Australia Limited, Melbourne, Australia

[21] Appl. No.: 367,238

[22] PCT Filed: Aug. 18, 1981

[86] PCT No.: PCT/AU81/00117
§ 371 Date: Mar. 31, 1982
§ 102(e) Date: Mar. 31, 1982

[87] PCT Pub. No.: WO82/00663
PCT Pub. Date: Mar. 4, 1982

[30] Foreign Application Priority Data
Aug. 19, 1980 [AU] Australia .............................. PE5119

[51] Int. Cl.³ .................... C22B 34/12; C01G 49/00; C01G 23/00

[52] U.S. Cl. ....................... 75/1 T; 423/83; 423/86

[58] Field of Search ................. 75/1 T; 423/76, 77, 423/78, 83, 86

[56] References Cited

U.S. PATENT DOCUMENTS 3,252,787 5/1966 Shiah .................................. 75/1 T

OTHER PUBLICATIONS

Becker et al., "A New Process for Upgrading Ilmenite Mineral Sand", The Australasian Institute of Mining Metallurgy, No. 214, pp. 21–45, Jun. 1965.

Primary Examiner—O. R. Vertiz
Assistant Examiner—Chung K. Pak
Attorney, Agent, or Firm—Cushman, Darby & Cushman

[57] ABSTRACT

A reduction process for the metallization of ferrotitaniferous materials comprising a partial metallization at a low temperature with hydrogen followed by a high temperature reduction with a carbonaceous reductant.

12 Claims, No Drawings

REDUCTION OF FERROTITANIFEROUS MATERIALS

TECHNICAL FIELD

The present invention relates to the metallization of the iron content of ferrotitaniferous materials, particularly naturally occurring ilmenites.

It is desirable to remove from ferrotitaniferous materials their iron content in order to make them more suitable for conversion to titanium containing products, chiefly titanium dioxide pigments.

BACKGROUND ART

There are several known methods of removing the iron content from ferrotitaniferous material. Most of these involve a reduction step to convert the iron content to a state whereby it may be conveniently separated from the relict titanium oxide material. For example in Australian Patent Specification No. 247 110 there is disclosed a multistep process for the upgrading of ilmenite wherein the ilmenite is reduced so that its iron content is metallized; the thus formed metallic iron is leached away from the titanium oxide material by a 'rusting' process using an aqueous reagent. In another process described in U.S. Pat. No. 3,252,787 ilmenite is metallized and the iron content then removed by treatment with ferric chloride solution. In yet another process described in Australian Patent Specification No. 515 061 metallized ilmenite particles are subjected to a segregation treatment whereby small iron metal particles dispersed throughout each particle of metallized ilmenite are translocated and agglomerated to form large particles outside the relict particles.

For such processes which require removal of iron by means of reactions with liquids or gases it is desirable to have the metallic iron particles in a very fine state, homogeneously dispersed and accessible to the reactants through pores from the outside of the particles of metallized ferrotitaniferous material.

Studies on the reduction of ilmenite reported by G. Ostberg (Jernkont Ann 1960 144) (1) p. 46–76) showed that iron precipitated in grains of ilmenite by reduction occurred as discrete particles, the number of which per given volume was greater when hydrogen was used as the reductant than when carbon monoxide or solid carbon was used. The size of the particles was inversely proportional to the number. The number of particles could be increased by lowering the temperature used. These observations would indicate that to obtain a homogeneous dispersion of fine particles of metallic iron, hydrogen reduction should be used at the lowest practicable temperature. Unfortunately because of unfavourable reaction equilibria hydrogen reduction is considerably more costly to carry out than reduction with solid carbon.

DISCLOSURE OF INVENTION

However we have now discovered a process for the metallization of the iron content of ferrotitaniferous materials by which the metallic iron is formed as fine particles homogeneously dispersed within the grains of the material. This process involves partial metallization of the ferrotitaniferous material with hydrogen at a low temperature, followed by completion of the metallization process using a solid carbon reductant at a higher temperature.

Accordingly the present invention provides a process for the metallization of the iron content of ferrotitaniferous material, which process comprises in sequence, a first reduction step of heating the said ferrotitaniferous material to a temperature in the range of 600° C. to 850° C. in a reducing atmosphere comprising hydrogen gas so that more than 5% and not more than 50% of the iron content of the ferrotitaniferous material is converted to the metallic state, and a second reduction step of heating the product from the first reduction step containing residual oxidized iron to a temperature of at least 950° C. in the presence of a solid carbonaceous material so that at least 90% of the iron content of the product from the second reduction step is in the metallic state.

It is essential in order to achieve the desired result from the process of the invention, namely the formation of fine particles of metallic iron, that at least 90%, and preferably at least 95%, of the iron content of the ferrotitaniferous material be in the trivalent state when it is submitted to the first reduction step. Some ferrotitaniferous materials will meet this requirement but in many cases it will be necessary to submit the ferrotitaniferous material to an oxidation step prior to the first reduction step.

Accordingly, in a further embodiment of the process of our invention we provide a process for the metallization of the iron content of ferrotitaniferous material, which process comprises in sequence an oxidation step of heating the said ferrotitaniferous material in an oxidizing environment to ensure that at least 90% of the iron content of the said material is in a trivalent state, a first reduction step of heating the product from the oxidation step to a temperature in the range of 600° C. to 850° C. in a reducing atmosphere comprising hydrogen gas so that more than 5% and not more than 50% of the iron content of the product from the oxidation step is converted to the metallic state, and a second reduction step of heating the product from the first reduction step to a temperature of at least 950° C. in the presence of a solid carbonaceous material so that at least 90% of the iron content of the product from the second reduction step is in the metallic state.

BEST MODE OF CARRYING OUT THE INVENTION

For convenience, it is preferable to mix the product from the oxidation step with the carbonaceous material destined to be the reductant in the second reduction step before it is subjected to the first reducing step. It is essential, in this instance, that the temperature in the first reduction step does not exceed 850° C. otherwise significant amounts of carbon reduction can occur which, in turn, will cause the metallic iron to be formed as relatively large particles. Below 600° C. no significant reduction with hydrogen will occur. Preferably the first reduction step is operated at between 700° C. and 800° C.

The time during which the treatment of the first reduction step is applied depends on the total iron content and its rate of reduction. The conditions of this first reduction step must prevail for long enough for at least 5% of the iron content to be converted to the metallic state. To proceed beyond 50% metallization would be wasteful as regards utilisation of hydrogen. Preferably the degree of metallization achieved in this step is between 10% and 20%.

In order to achieve optimum utilization of the hydrogen in the first reduction step the solids are preferably contacted with the hydrogen in a counter-current manner. If fluidized bed reactors are used this is conveniently achieved by using at least two reactors. In the first reactor the solid product from the oxidation step is contacted with, and partly reduced by partially oxidized gas from the second reactor. In the second reactor the reduced product from the first reactor is partially metallized by hydrogen.

If the carbonaceous material has not been added to the ferrotitaniferous material prior to the first reduction step, the product from this reduction step is mixed with carbonaceous material required as the reductant in the second reduction step and the mixture is then subjected to the second reduction step.

The proportion of carbonaceous material to ferrotitaniferous material in the second reduction step is not critical but there must be sufficient carbon present to reduce all the un-metallized iron content in the product from the first reduction step. Preferably the ratio of solid carbonaceous material to ferrotitanferous material on a w/w basis is in the range of 0.1:1 to 0.3:1.

Solid carbonaceous materials which are suitable for use in the process of this invention are coal, coke and char. Although no hydrogen gas has to be added in the second reduction step it is likely that residual amounts from the first reduction step will be present and some could be generated by reaction of water with the carbonaceous material.

Provided the temperature is above 950° C. in step 3 the remaining oxidized iron can be metallized by the carbonaceous reductant, however temperatures in excess of 1300° C. are undesirable because the titanium oxide phase will start to sinter. Preferably the temperature used in the second reduction step is between 1000° C. and 1200° C.

INDUSTRIAL APPLICABILITY

The process of the invention is useful for the metallization of many titanium-bearing materials. Such ferrotitaniferous materials include, for example, those derived from titanium-bearing ores generally called "ilmenite" which term includes the mineral ilmenite, $FeTiO_3$, and other minerals having the ilmenite structure such as $(Fe,Mn,Mg)TiO_3$ as well as oxidized forms of ores containing iron in the ferric state and weathered forms of such ores. Other names given to these materials include ulvospinel, arizonite, pseudobrookite, titanomagnetite and kalkowskyn for example. Other suitable titaniferous materials include any of the above which also contain iron oxide inclusions, as well as materials described as iron sands. The titanium-bearing ores usually occur in beach sand or as rock deposits.

Generally, if the ferrotitaniferous material to be metallized is derived from beach sand, there is no need to reduce its particle size prior to carrying out the process of the invention on it, but if it is of rock origin then it is necessary to grind it to reduce its particle size to that suitable for use in the process. Preferably the ferrotitaniferous material to be treated by the process of this invention should consist of particles in the size range of 50 microns to 400 microns.

The process of the invention has no substantial effect on the particle size of the ferrotitaniferous material. This is an advantage because, if the metallic iron content is removed by one of the known processes which also have no effect on particle size, the relict titanium oxide particle will be of convenient size for the processes commonly used to convert the titanium oxide to a pigment product.

It is characteristic of the process of the invention that it produces particles of titanium oxide material in which the metallized iron content is dispersed as fine particles which are less than 3 microns in size. These particles are homogeneously distributed throughout the titanium oxide particles.

It is this homogeneous distribution of fine metallic iron particles which provides the major advantage of the process of the invention. The same type of product can be made by reduction with hydrogen alone. However the process of the invention has a significant economic advantage in that a major part of the reduction is achieved by use of a solid carbon reductant. Efficient utilization of hydrogen requires complex and costly recycle processes.

Metallized ilmenite having its metallic iron content in the form of fine particles, evenly distributed and accessible, such as produced by the process of this invention, has been shown to be a suitable starting material for the segregation process disclosed in Australian Patent Specification No. 515 061.

The process of the invention is now illustrated by, but not limited to, the following example. In this example all parts and percentages are by weight unless otherwise stated.

EXAMPLE 1

A sample of beach sand ilmenite from west coast area of Australia (containing 54.7% $TiO_2$, 25.3% FeO, and 16.6% $Fe_2O_3$; size range −52, +200 BS Sieve mesh) was heated in a shallow tray to 1000° C. for five hours in an oxidizing combustion gas atmosphere.

The oxidized product obtained contained 30.1% iron, 98.5% of which was in the ferric state. A 50 g sample of this oxidized product was mixed with 12.7 g of brown coal char (particle size range −52+200 BSS).

The mixture was heated to 760° C. in a vibrating bed reactor for approximately 5 minutes during which time 9.83 mole of hydrogen was passed through the bed. A parallel experiment using similar conditions showed that about 15% metallization of the iron would have taken place.

The vibration of the bed was stopped and the temperature raised to 1100° C. over approximately 15 minutes. The static bed was maintained at a temperature between 1050° C. and 1100° C. for 2 hours.

At least 95% of the iron content of the product ferrotitaniferous particles had been metallized. The product particles were in the same size range as the original ilmenite. Microscopic examination of the product particles showed that the particle size and distribution of the metallic iron particles in them were similar to those obtained when only hydrogen at about 750° C. was used to metallize a similar sample. A portion of the product, which was magnetic, was leached with dilute hydrochloric acid, washed and dried. The leached product was non-magnetic and microscopic examination of it revealed that the metallic iron particles had been dissolved away.

The average size of the metallic iron particles in the product particles was about 2 microns.

By way of comparison another sample of similar beach sand ilmenite on reduction with carbon at a high temperature (1150°–1200° C.) gave a product consisting of titanium oxide particles with large metallic iron agglomerates varied greatly in shape and size but commonly appeared as particles having a largest dimension of 20 microns, some having a largest dimension of 100 microns.

I claim:

1. A process for the metallization of the iron content of ferrotitaniferous material, which process comprises in sequence, a first reduction step of heating the said ferrotitaniferous material to a temperature in the range of 600° C. to 850° C. in a reducing atmosphere comprising hydrogen gas so that more than 5% and not more than 50% of the iron content of the ferrotitaniferous material is converted to the metallic state, and a second reduction step of heating the product from the first reduction step containing residual oxidized iron to a temperature of at least 950° C. in the presence of a solid carbonaceous material so that at least 90% of the iron content of the product from the second reduction step is in the metallic state.

2. A process according to claim 1 which process comprises in sequence an oxidation step of heating the said ferrotitaniferous material in an oxidizing environment to ensure that at least 90% of the iron content of the said material is in a trivalent state, a first reduction step of heating the product from the oxidation step to a temperature in the range of 600° C. to 850° C. in a reducing atmosphere comprising hydrogen gas so that more than 5% and not more than 50% of the iron content of the product from the oxidation step is converted to the metallic state, and a second reduction step of heating the product from the first reduction step to a temperature of at least 950° C. in the presence of a solid carbonaceous material so that at least 90% of the iron content of the product from the second reduction step is in the metallic state.

3. A process according to claim 2 wherein in the said oxidation step at least 95% of the iron content is converted to the trivalent state.

4. A process according to claim 1 or claim 2 wherein the said solid carbonaceous material is mixed with the ferrotitaniferous material prior to the first reduction step.

5. A process according to claim 2 wherein the temperature of the first reduction step is in the range from 700° C. to 800° C.

6. A process according to claim 1 or claim 2 wherein in the first reduction step more than 10% w/w and less than 20% w/w of the iron content is converted to metallic iron.

7. A process according to claim 1 or claim 2 wherein in the first reduction step the ferrotitaniferous material is contacted with the hydrogen by countercurrent means.

8. A process according to claim 1 or claim 2 wherein the said solid carboniferous material is selected from the group consisting of coal, coke, char and mixtures thereof.

9. A process according to claim 1 or claim 2 wherein the weight/weight ratio of the solid carbonaceous to the ferrotitaniferous material is in the range of 0.1:1 to 0.3:1.

10. A process according to claim 1 or claim 2 wherein the temperature of the second reduction step is in the range from 950° C. to 1130° C.

11. A process according to claim 1 or claim 2 wherein the temperature of the second reduction step is in the range from 1000° C. to 1200° C.

12. A process according to claim 1 or claim 2 wherein the said titaniferous material is reduced by physical means to a particle size in the range of from 50 to 400 microns prior to treatment by the said process.

* * * * *